United States Patent
Edwards et al.

(10) Patent No.: US 9,473,329 B1
(45) Date of Patent: Oct. 18, 2016

(54) ANALOG FRONT-END WITH GALVANICALLY ISOLATED DIFFERENTIAL BUS

(71) Applicant: Holt Integrated Circuits, Mission Viejo, CA (US)

(72) Inventors: Jomo K. Edwards, Aliso Viejo, CA (US); David J. Mead, Newport Coast, CA (US); William G. Holt, Sequim, WA (US); George S. Noh, Irvine, CA (US); Kevin P. Smith, Mission Viejo, CA (US)

(73) Assignee: HOLT INTEGRATED CIRCUITS, Mission Viejo, CA (US)

( * ) Notice: Subject to any disclaimer, the term of this patent is extended or adjusted under 35 U.S.C. 154(b) by 51 days.

(21) Appl. No.: 14/644,034

(22) Filed: Mar. 10, 2015

Related U.S. Application Data

(60) Provisional application No. 62/106,104, filed on Jan. 21, 2015.

(51) Int. Cl.
*H04L 25/02* (2006.01)
*H04L 27/00* (2006.01)
*H04L 27/06* (2006.01)

(52) U.S. Cl.
CPC ....... *H04L 25/0268* (2013.01); *H04L 25/0292* (2013.01); *H04L 27/0002* (2013.01); *H04L 27/06* (2013.01)

(58) Field of Classification Search
CPC ............. H01L 23/48; H01L 23/49589; H04L 25/0266; H04L 25/0268; H04L 25/0272; H04L 27/06; H04L 25/0292; H04L 27/0002
See application file for complete search history.

(56) References Cited

U.S. PATENT DOCUMENTS

| | | | | |
|---|---|---|---|---|
| 7,902,627 | B2* | 3/2011 | Dong | H01L 23/66 257/499 |
| 8,674,486 | B2* | 3/2014 | Haigh | H01L 23/49503 257/676 |
| 8,867,592 | B2* | 10/2014 | Shrestha | H04L 25/0268 307/104 |
| 2012/0134428 | A1* | 5/2012 | Bobrek | H04B 3/00 375/258 |

OTHER PUBLICATIONS

Arinc, Mark 33 Digital Information Transfer System (DITS), Part 3 File Data Transfer Techniques, Arinc Specification 429P3-17, Published May 17, 1999.

* cited by examiner

*Primary Examiner* — Vineeta Panwalkar
(74) *Attorney, Agent, or Firm* — Blakely Sokoloff Taylor & Zafman LLP

(57) ABSTRACT

Disclosed herein, one embodiment of the disclosure is directed to an apparatus for receiving Aeronautical Radio, Incorporated (ARINC) 429 bus signals. The apparatus may comprise: a modulator that modulates the ARINC 429 bus signals onto a carrier signal and generates a modulated signal using only power supplied by the ARINC 429 bus; and a demodulator that recovers ARINC 429 bus baseband binary data from the modulated signal, wherein the modulated signal propagates from the modulator to the demodulator through capacitive coupling.

22 Claims, 8 Drawing Sheets

ANALOG FRONT-END WITH GALVANICALLY ISOLATED DIFFERENTIAL BUS

RELATED APPLICATIONS

This application claims priority to provisional patent application Ser. No. 62/106,104, entitled Galvanically Isolated Line Receiver, filed Jan. 21, 2015, which is incorporated in its entirely herein by reference.

FIELD

Embodiments of the disclosure relate to serial data transmitter/receiver systems with a galvanically isolated differential bus, and more particularly to a galvanically isolated monolithic single supply analog front-end for use in avionics systems.

BACKGROUND

ARINC (Aeronautical Radio, Incorporated) 429 specification, also known as Mark 33 Digital Information Transfer System (DITS) specification, defines the standard requirements for the transfer of digital data between avionics systems on commercial aircraft. The specification defines the physical layer electrical characteristics, data word structure, and the timing and protocol necessary to establish a bus communication link. For instance, in accordance with the current ARINC 429 specification, the physical layer media is simplex, using a 780 shielded twisted pair cable. The link uses a Return-to-Zero (RZ) line-code or modulation. In RZ modulated transmission each bit cycle time ends with the signal level at 0V or equivalently at the NULL level. The transmitter drives the bus differentially with controlled transition slew-rates and a prescribed output source impedance such as 75Ω±5Ω.

Typically, ARINC 429 communication links are deployed in multi-voltage environments plagued by ground loops and are susceptible to transient surge voltages induced by lightning incident on the airframe. Commercial aircraft are relatively large so the ARINC 429 line drivers and line receivers often do not work in close proximity, which leads to finite impedance differences in the transmitter and receiver grounds (i.e., ground loop). This finite impedance differences along with vast and complex electrical power systems of the various ARINC 429 interconnected avionic equipment can create large common-mode bus voltage and power/ground short circuit or glitch hazards resulting in receiver damage. These power faults may propagate to the delicate and expensive mission critical subsystems that are processing the ARINC 429 bus data.

RTCA (Radio Technical Commission for Aeronautics)/DO-160G section 22 specifies the susceptibility of a device to lightning induced transient surge voltages. The effects of lightning on commercial aircraft are highly regulated worldwide today, due to the increased use of composite materials, such as Carbon Fiber Composite (CFC). In fact, CFC is now widely used for recently introduced airframe designs such as Boeing® 787 and Airbus® A380 airframes. The lightweight property of CFC is very attractive to the aerospace industry where weight/thrust ratios are critical for operation, maneuverability, and fuel efficiency.

Prior to the use of CFC materials, the airframe and most other parts of the airplane were made of metal. Thus, if a lightning strike occurred at the nose of the plane, during takeoff for instance, the lightning would travel outside the plane to the tail, exit the surface of the plane, and terminate to ground. The solid metal construction of the airframe acted as a Faraday cage, providing an extremely low impedance path for the lightning current. This prevented coupling of voltages and currents to the internal ARINC 429 bus cable in the plane, which sometime is routed along the side of the plane, between the inside of the outer skin and the interior bulkhead, and throughout the wing. This also greatly reduced the susceptibility of the mission critical components located inside the plane connected via ARINC 429. CFC materials, however, do not conduct lightning currents the way metal airframes do. As a result, the increased impedance of the outer skin as a path for the lightning increases the possibility of higher voltages and currents coupling directly onto internal ARINC 429 cables, and thus to the airborne utilization equipment they link. The result could be catastrophic.

SUMMARY

According to one embodiment of the disclosure, one or more semiconductor components are configured to galvanically isolate the differential bus pins from digital output pins, and in some embodiments, from all other device pins and/or the die substrate. For this embodiment, the receiver has only one supply domain, namely power ($V_{DD}$) and ground ($V_{SS}$), which only powers the digital portion of the receiver. The digital portion is capacitively isolated from the bus portion of the receiver. The amount of direct current (DC) isolation provided between the bus portion and a targeted electrical component (e.g., application specific integrated circuit "ASIC", microcontroller "μC", field programmable gate array "FPGA", etc.) is greater than ±660 volts (V), such as approximately ±900V. The semiconductor component(s) may be a receiver, namely an Aeronautical Radio, Incorporated (ARINC) 429 compliant receiver for example, which may have integrated transient voltage surge protection and/or may be compliant with RTCA/DO-160G, Section 22 Level 3 Pin Injection. When in a monolithic deployment, no external components are required to provide the DC isolation.

Disclosed herein, one embodiment of the disclosure is directed to an apparatus for receiving ARINC 429 bus signals. The apparatus may comprise: a modulator that modulates the ARINC 429 bus signals onto a carrier signal and generates a modulated signal using only power supplied by the ARINC 429 bus. The apparatus further comprises a demodulator that recovers ARINC 429 bus baseband binary data from the modulated signal, wherein the modulated signal propagates from the modulator to the demodulator through capacitive coupling.

BRIEF DESCRIPTION OF THE DRAWINGS

The disclosure may best be understood by referring to the following description and accompanying drawings that are used to illustrate embodiments of the disclosure by way of example and not limitation. In the drawings, in which like reference numerals indicate similar elements.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

Herein, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Embodiments of the disclosure relate to a galvanically isolated electrical component, namely a receiver, transmitter or transceiver (hereinafter generally referred to herein as an "analog front-end"), which is configured to isolate and protect sensitive avionic systems on a bus from dangerous transients. Integrated galvanic isolation in the analog front-end blocks all DC (direct current) currents and voltages from the bus, isolating an electrical component, such as the complementary metal-oxide-semiconductor (CMOS) protocol device (e.g., ASIC, µC, FPGA, etc.) from large ground offsets and large transmitter (TX) power supply excursion. This effectively gives the analog front-end an input common-mode range up to the breakdown voltage of the galvanic isolation medium. It also eliminates the need for external transient-voltage-surge (TVS) devices that are needed for RTCA/DO-160G compliance.

While the description is directed to one of the embodiments of the analog front-end, such as an ARINC 429 receiver for example, it is contemplated that the inventive aspects may be deployed for other electrical components, including any receivers, transmitters and/or transceivers which utilize differential buses. Such differential buses may include TIA (Telecommunications Industry Association)-485, TIA-422, controller area network (CAN) bus, etc.

Figure 1:
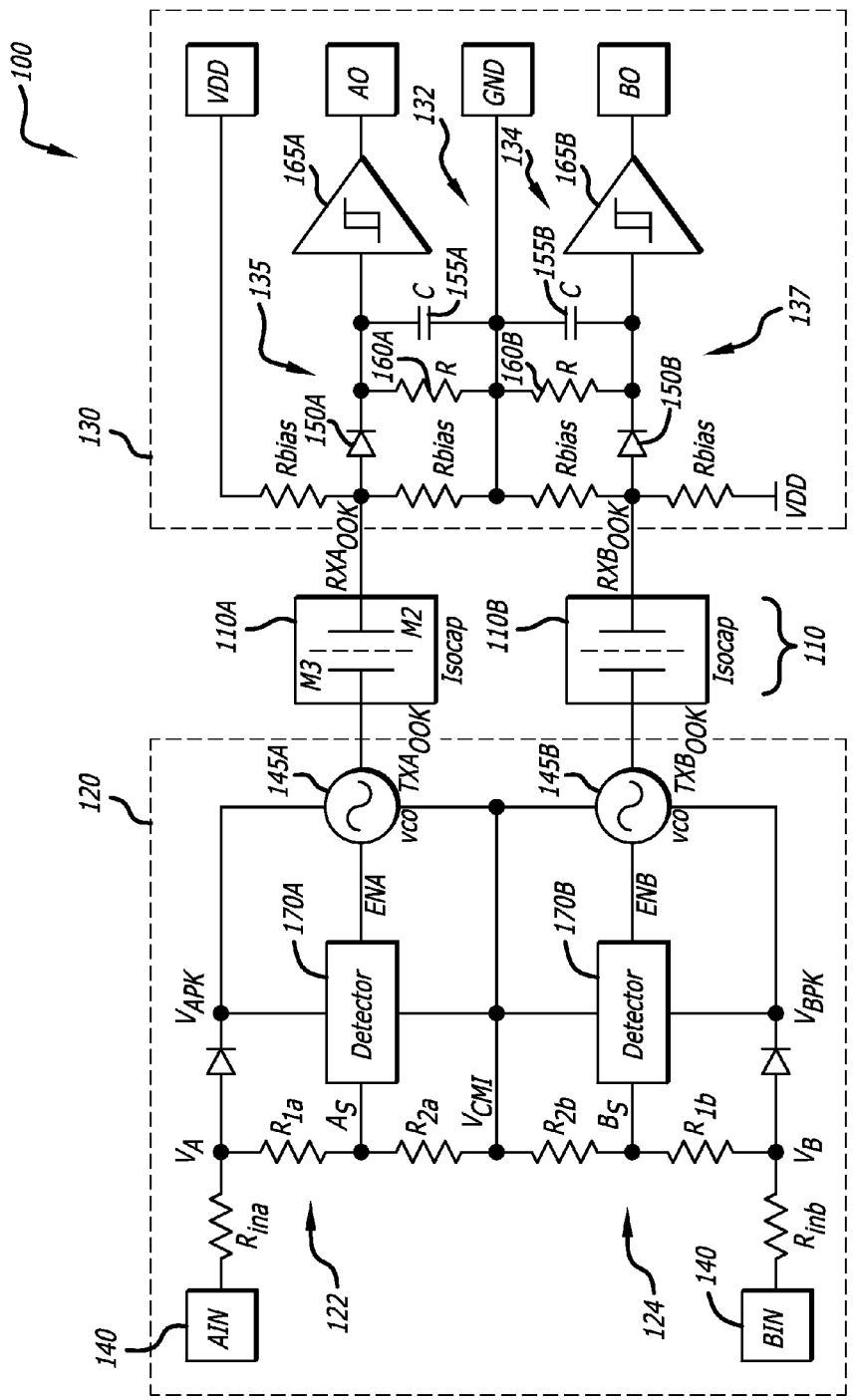
FIG. 1 is a diagram illustrating functional components of an exemplary galvanically isolated monolithic single supply ARINC 429 analog front-end.

Referring to FIG. 1, a diagram illustrating functional components of an exemplary monolithic, galvanically isolated ARINC 429 analog front-end 100, according to one embodiment of the disclosure, is shown. Herein, the ARINC 429 analog front-end 100 comprises one or more isolation capacitors (isocaps) 110 interposed between a modulator 120 and a demodulator 130. The modulator 120 includes a plurality of input terminals 140 for receiving ARINC 429 bus signals via a differential bus, where the ARINC 429 bus signals are modulated onto higher-frequency carrier signals. The higher-frequency carrier signals are provided to the demodulator 130 via isocaps 110, where the demodulator 130 is configured to recover the ARINC 429 bus signals from the higher-frequency carrier signals generated by the modulator 120. As shown, the demodulator 130 and the modulator 120 are capacitively coupled through the isocaps 110, which provide galvanic isolation, by allowing AC (alternating current) signal components and blocking DC signal components.

According to this embodiment of the disclosure, the circuitry of the modulator 120 is symmetric with respect to the input's common-mode voltage ($V_{CMI}$), while the circuitry of the demodulator 130 is symmetric with respect to the ground (GND). A first circuit 122 of the modulator 120 (e.g., an upper symmetric circuit of modulator 120) uses voltage division to derive voltages $V_A$, $A_S$, and $V_{CMI}$, as shown in FIG. 1. The voltage $V_A$ is then half-wave rectified, and the rectified voltage $V_{APK}$ serves as the positive power rail for the modulator 120, notably the signal detector 170A. The differential common-mode voltage $V_{CMI}$ is used as the negative power supply rail. Therefore, the modulator 120 is powered by the ARINC 429 data bus without any other external power source.

When the ARINC 429 bus is idle, both input terminals 140 $A_{IN}$ and $B_{IN}$ are NULL (e.g., low voltage nearing 0 volts with respect to the common-mode voltage $V_{CMI}$), and the modulator 120 is essentially powered down. When the ARINC 429 bus is active and the differential swing is sufficient (e.g., greater than 6.25V), the modulator 120 is powered. The power-on voltage is set below the ARINC specification (e.g., 6.5V) for receiver sensitivity, as described below in more detail. The attenuated ARINC 429 bus signal $A_S$ is processed with the rectified bus voltage ($V_{APK}$) to form a modulating (message) signal.

Generated by a high-gain fast start-up astable multivibrator (VCO "voltage-controlled oscillator") 145A, a higher-frequency carrier signal is modulated by a modulating baseband signal. In other words, the modulating (message) signal is modulated with on-off keying (OOK) modulation to generate the $TXA_{OOK}$ signal. The $TXA_{OOK}$ signal drives a first (e.g. top) metal-3 (M3) plate of the isocap 110A. OOK is the simplest form of amplitude-shift keying (ASK) modulation that represents digital data as the presence or absence of a carrier wave. In one embodiment described herein, the presence of a carrier for a specific duration represents a binary "one", while its absence for the same duration represents a binary "zero". It is contemplated that a second circuit 124 of the modulator 120 (e.g., a lower symmetric circuit of the modulator 120) substantially operates in the same manner as the first circuit 122 as they are symmetric circuits.

It should be appreciated that the described modulation method does not limit the disclosure. Other modulation methods have also been contemplated and can be used with different embodiments than the present disclosure.

The demodulator 130 receives the modulated signal on the other side of the isolation barrier through a second (e.g., bottom) metal-2 (M2) plate of the isocap 110A. It is contemplated that the M3 material composition may be the same or different than the M2 material composition. The circuitry of the demodulator 130 (e.g., upper circuit 132 and lower circuit 134 of the demodulator 130) that correspond to the first and second circuits 122 and 124 of the modulator 120 work similarly. It should be appreciated that the disclosure is not limited by the layers of metal that constitute the plates of the isocaps 110. The plates of an isocap 110 may be formed on any two metal layers separated by a dielectric.

For instance, the received $RX_{OOK}$ signal (e.g. $RXA_{OOK}$ signal associated with the upper circuit 132 of the demodulator 130) is filtered and then demodulated. The filter (not shown in FIG. 1, see FIGS. 8-9) may be a single pole high-pass filter with a pole frequency close to the isocap and DC-bias resistor frequency. The output of the filter drives an inverting buffer (not shown) with a threshold of half of the positive supply voltage $V_{DD}$ (e.g., a threshold of approximately $V_{DD}/2$). The buffer's output is held at GND for input swings less than a p-channel metal-oxide-semiconductor (PMOS) threshold ($V_{THP}$). This buffered signal is then demodulated. The buffered signal may be demodulated with a CMOS buffer that drives an envelope detector 135.

According to one embodiment of the disclosure, the envelope detector 135 includes a half-wave rectifier which, during the positive half cycles of the incoming $RXA_{OOK}$ signal, causes diode 150A to become forward-biased, rapidly charging capacitor C 155A to the peak of the input signal. When the input signal falls below the threshold value, the diode 150A becomes reverse biased and the capacitor C 155A discharges through the load resistor R 160A. The discharge process continues until the next positive half cycle. When the input signal becomes greater than the voltage across the capacitor C 155A, the diode 150A conducts again and the process is repeated. Preferably, a CMOS Schmitt-trigger 165A is used as the demodulator output stage to maintain voltage thresholds and improve duty cycle distortion performance. The same architecture and similar operation of envelope detector 137, which comprises diode 150B, capacitor C 155B, and load resistor 160B, is provided as the lower circuit 134 (e.g., lower-half circuitry of the modulator 130). The CMOS Schmitt trigger 165B is coupled to envelope detector 137.

Figure 2:
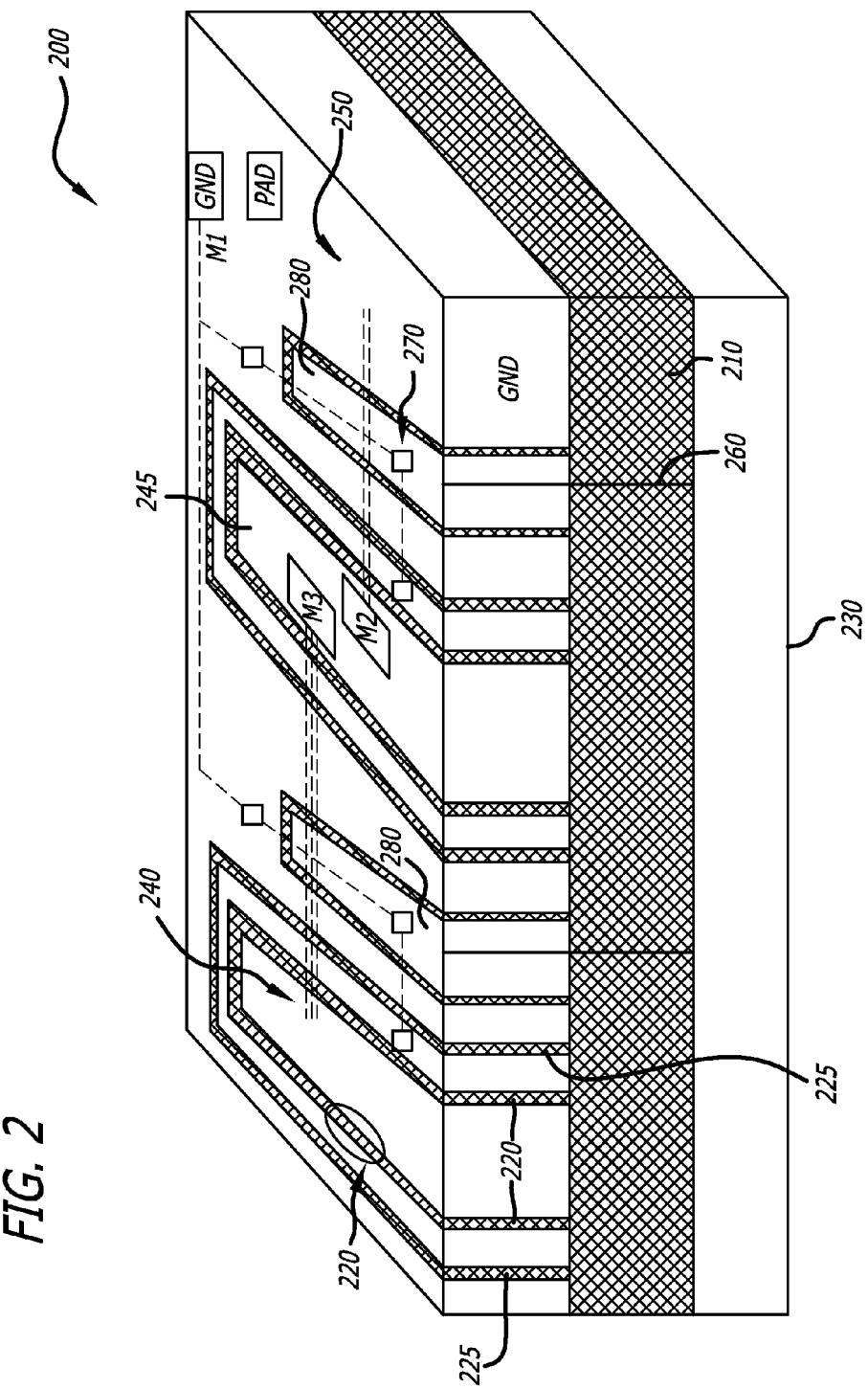
FIG. 2 is a diagram illustrating the three-dimensional physical structure of the exemplary ARINC 429 analog front-end.
Figure 3:
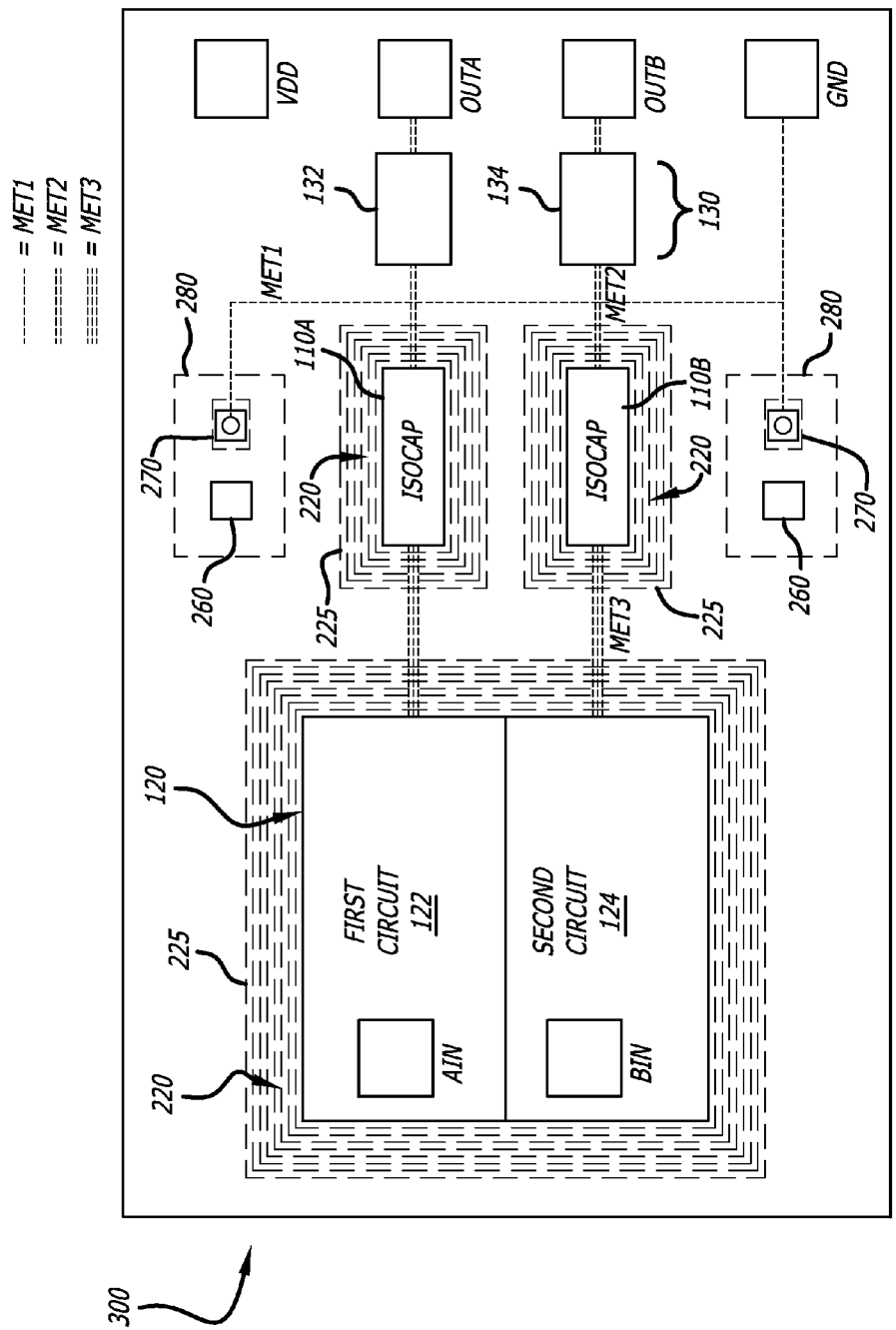
FIG. 3 is a diagram illustrating a top view of the physical structure of the exemplary ARINC 429 analog front-end.

Referring to FIGS. 2 and 3, diagrams of the physical structure of an exemplary ARINC 429 analog front-end 100, according to one embodiment of the disclosure described herein, are shown. FIG. 2 is a diagram illustrating a three-dimensional physical structure 200 of the exemplary ARINC 429 analog front-end 100 of FIG. 1, and FIG. 3 is a diagram illustrating a top layout view 300 of the physical structure 200 of the exemplary ARINC 429 analog front-end 100.

As shown, the ARINC 429 analog front-end 100 of FIG. 2 is fabricated with a CMOS silicon on insulator (SOI) process and comprises an active layer 250, a substrate layer 230 (sometimes referred to as a "wafer handle" or "WH"), and an intermediary insulator layer 210. More specifically, the active layer 250 comprises dielectrically isolated silicon islands, sometimes referred to as p-type doped tubs or "PTUBs", which may be realized with the CMOS SOI process. Within the fabricated circuitry that is part of the active layer 250, vertical isolation is achieved by the insulator layer 210 (e.g., buried oxide layer "BOX") and lateral isolation is achieved by trenches 220 through the active layer 250 to the insulator layer 210. Hence, according to one embodiment of the disclosure, PTUBs are isolated laterally from adjacent PTUBs by one or more oxide trenches 220 that extend vertically down to the insulator layer 210.

The PTUB-to-wafer handle breakdown voltage is determined by the dielectric breakdown of the insulator layer 210 (e.g., BOX). Therefore, the PTUB-to-WH breakdown voltage is an absolute limiting breakdown parameter. To take advantage of the full range of the PTUB-to-WH breakdown voltage, the lateral active PTUB-to-PTUB breakdown voltage should be at least as high as the PTUB-to-WH breakdown voltage. The lateral PTUB-to-PTUB breakdown voltage may be increased by placing more trenches 220 between the PTUBs, with the intermediate (i.e., inter-trench) PTUBs floating.

In one embodiment of the disclosure, adjacent active PTUBs are separated by seven trenches 220. It should be appreciated that the number of trenches does not limit the disclosure. More trenches 220 than seven may be deployed to separate adjacent active PTUBs, although using more than the optimal number of trenches 220 may not improve the breakdown voltage of the overall ARINC 429 analog front-end 100 described hereinafter because of the limitation of the PTUB-to-WH breakdown voltage. Fewer trenches 220 than seven may be deployed to separate adjacent active PTUBs, although using fewer than the optimal number of trenches decreases the lateral active PTUB-to-active PTUB breakdown voltage and therefore the breakdown voltage of the overall ARINC 429 analog front-end 100 described hereinafter.

The circuitry associated with the modulator 120, including the bus pads associated with the input terminals 140, reside in a PTUB 240 at $V_{CMI}$ potential enclosed by one or more floating or isolation PTUBs (e.g., logic separated by trenches 220). To prevent the PTUB-to-PTUB parasitic capacitance from coupling AC signals across the isolation PTUBs, the isolation PTUBs are enclosed by at least one further trench 225 that is at the GND/WH potential, shunting any potentially harmful AC transients to GND. The coupling isocap 110 is a (rectangular) parallel-plate metal-3 (M3) to metal-2 (M2) capacitor that does not extend beyond the boundaries of the floating PTUB 245 beneath it.

As shown in FIG. 3, a metal-1 (M1) connection is represented by a single dashed line to identify the metal interconnects between the ground of the ARINC 429 analog-front end and P-diffusion contacts "PDIFF_CNTs" 270. The metal-2 (M2) connection is represented by two close, parallel dashed lines to identify metal interconnects between the second plate of isocaps 110A, 110B and the digital outputs of the ARINC 429 analog-front end 100. Lastly, the metal-3 (M3) connection is represented by three close, parallel dashed lines to identify the metal interconnects between the first plate of the isocaps 110A, 110B and corresponding first and second circuits 122 and 124 of modulator 120.

Each of the two isocaps 110A, 110B resides in its respective (separate) floating PTUB 245. As shown, each of the isocaps 110A, 110B is enclosed by one or more floating isolation trenches 220 and a further trench 225 at the GND/WH potential in a similar fashion to the PTUB 240 where the first/second circuit 122, 124, of the modulator 120 resides. In one embodiment, these geometrics create an active silicon area where the ARINC 429 bus signal is DC isolated from the substrate 230 and the next active silicon region 250 by approximately ±1 kV, with ground terminating AC shunt for noise transients, and a floating rectangular parallel-plate metal capacitor with the same isolation parameters.

All remaining circuitry outside the modulator 120 and the isocaps 110 resides in the overall substrate. The demodulator 130 GND and any silicon area outside of the modulator 120 and isocap 110 isolation structures are at GND potential. The WH is also grounded by a special wafer handle contact 260 that creates a resistive tunnel from a PTUB down to the wafer handle 230, thus creating a wafer handle tub (WH-TUB) 280.

The capacitor electrodes are routed over silicon area at GND potential in metal-3 (M3) and metal-2 (M2). In one embodiment, the carrier signal in metal-3 (M3) from the modulator 120 can be ±1 kV with respect to GND. With all potential sneak path breakdowns accounted for, the modulator 120-to-demodulator 130 signaling isolation is determined by the M3-to-M2 inter-metal-dielectric (IMD) of each isocap 110A, 110B. In one embodiment, an M3-to-M2

IMD thickness of approximately 1050 nm generally corresponds to a 1.05 KV breakdown voltage.

Figure 4:
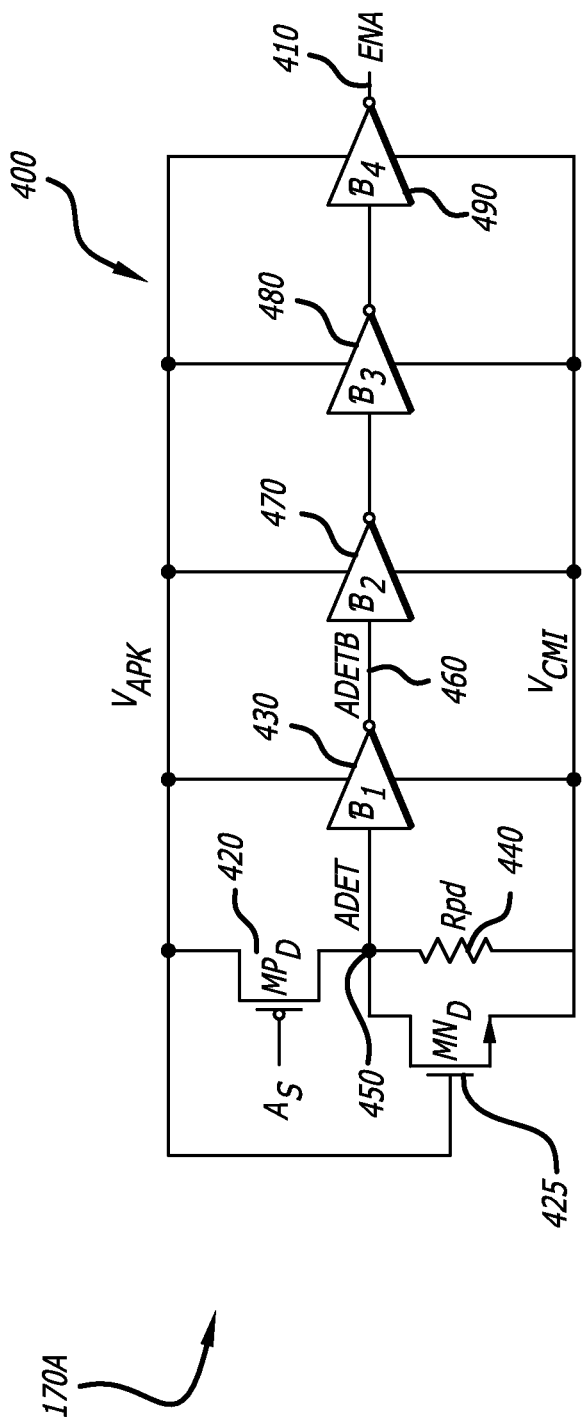
FIG. 4 is a diagram illustrating an exemplary half circuit for the differential ARINC 429 bus detector circuit.

Referring to FIG. 4, a diagram illustrating an exemplary embodiment of the signal detector 170A of FIG. 1, which is illustrated as a half circuit 400 for a differential ARINC 429 bus detector circuit, is shown. It is contemplated that signal detector 170B comprises circuitry that operates in a similar manner as half circuit 400, as would be easily appreciated by a skilled person in the art. An enable signal ENA 410 output from the half circuit 400 is "asserted" (logic "1") for an ARINC 429 high level and zero otherwise. The enable signal ENA 410 is not asserted (initialized/reset to $V_{CMI}$, the negative supply rail of the modulator 120 that corresponds to logic zero) during the null phase. The enable signal ENA 410 is asserted (i.e., switched to logic "1") when an ARINC bus voltage is greater than an implemented threshold. According to one embodiment, as described above, the implemented threshold is |6.25|V, taking into consideration the ARINC 429 minimum differential amplitude specification of approximately ±6.5V. The threshold is determined by the PMOS source follower ($MP_D$) 420 and the transfer characteristics of CMOS inverter B1 430. As seen in FIG. 1, the ARINC bus is shunted by a differential resistor ladder ($R_{ina}$, $R_{1a}$, $R_{2a}$, $R_{2b}$, $R_{1b}$, $R_{inb}$) of FIG. 1, with the center point being the arithmetic mean or common-mode voltage $V_{CMI}$. The remaining points on the resistor ladder can be modeled, 1st order, as:

$$V_A = A_{IN}\frac{R_{1a}}{R_{ina}R_{1a}}, A_S = V_A\frac{R_{2a}}{R_{1a}+R_{2a}},$$

with "$V_{APK}$" being the half-wave rectified value of $V_A$ (e.g., $V_A-V_{BE}$, $V_{BE}$ being voltage across the diode) and acting as the power supply rail of the modulator 120. The relative values of the resistors in the divider are $R_{1a} > R_{2a} > R_{ina}$. The detector input signal $A_S$ is only a function of the differential ARINC 429 bus amplitude. The difference ($V_{APK}-A_S$) is constant over the input common-mode voltage $V_{CMI}$.

Figure 5A:
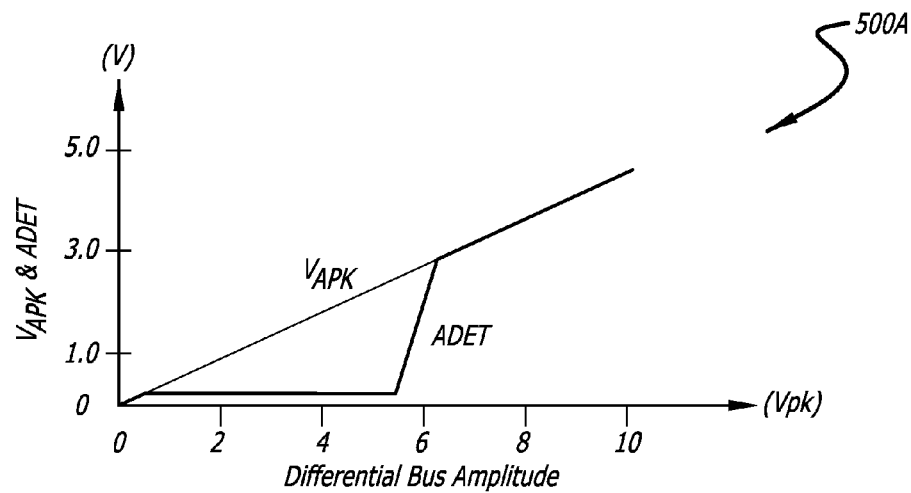
FIGS. 5A and 5B are exemplary illustrations of the overall detector transfer characteristics.
Figure 5B:
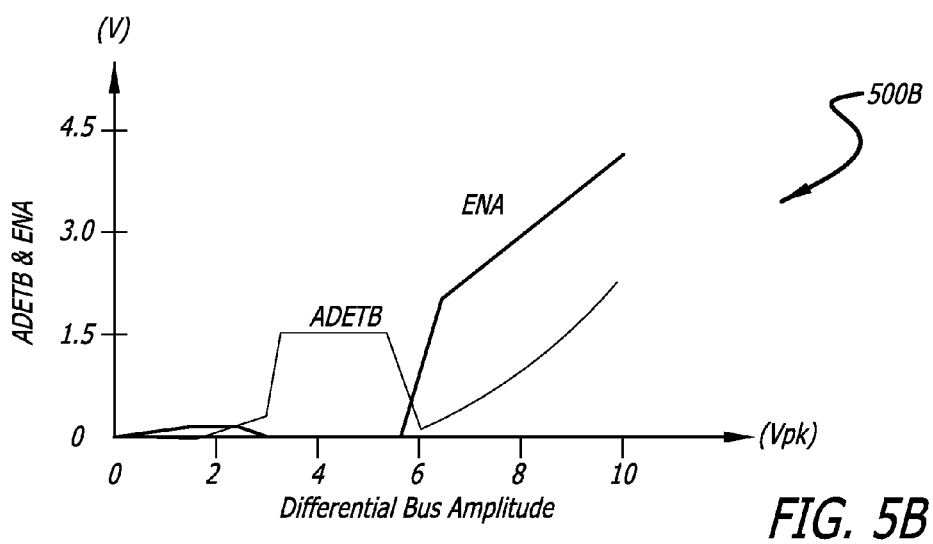

Referring to FIGS. 5A and 5B, exemplary illustrations 500A, 500B of the overall signal detector transfer characteristics are shown. According to one embodiment, as illustrated in FIGS. 4, 5A, and 5B, when the ARINC 429 bus begins to transition from null, PMOS source follower ($MP_D$) 420 of FIG. 4 will leave the sub-threshold domain and will first operate in the active region. The $MP_D$ 420 along with resistor (Rpd) 440 will function more like a PMOS inverter than a source follower. ADET 450 initially has the potential of being pulled up with $V_{APK}$, but is pulled by Rpd 440 for: $V_{APK}-ADET > V_{SGP}-|V_{THP}|$, where "$V_{SGP}$" is the source-to-gate voltage of the p-type transistor. $V_{APK}$ is not sufficient to power the current source $MN_D$ 425 in this region defined by less than or equal to 5.5V of differential ARINC 429 bus amplitude. Once $V_{APK}-V_{CMI}$ is greater than a threshold voltage (e.g., 60 mV, which is greater than the sum of $|V_{THP}|$ and $V_{THN}$), the inverter B1 430 is functional and sets ADETB 460 to the correct logic "1" level. The remaining three inverters 470, 480 and 490 are used as gain stages, so the enable signal ENA 410 is delayed and gained versus ADET 430. As the ARINC 429 bus voltage increases so does $V_{SG}$ (e.g., source-to-gate voltage) of $MP_D$ 420. When $V_{GS}-|V_{THP}|$ is greater than $V_{SD}$ ("$V_{GS}$" being the gate-to-source voltage, and "$V_{SD}$" being the source-to-drain voltage), $MP_D$ 420 will enter the triode mode. This point is controlled by:

$$V_{SG} = |V_{THP}| + \sqrt{\frac{2LI_D}{\mu C_{OX}W}}, \quad (1)$$

where "L" is the gate length, "W" is the gate width, "$I_D$" is the drain current, "μ" is the zero-field mobility, and "$C_{OX}$" is the gate oxide capacitance per unit area.

By setting the saturation point and the appropriate device resistance, $MP_D$ 420 will pull ADET 450 to $V_{APK}$. The device resistance is governed by:

$$R_{MPD} = \frac{1}{\frac{W}{L}\mu C_{OX}(V_{SG}-|V_{THP}|)}, \quad (2)$$

The dimensions of $MP_D$ 420 may be determined theoretically using equations (1) and (2) for the $A_S$ equivalent of 6.0V differential ARINC 429 bus amplitude. The switching threshold of B1 needs to be tuned for the high value of the detection signal. A CMOS inverter has 5 regions of operation. The switching characteristic is determined by the middle region where both n- and p-devices are in saturation; in this region: $I_{DSP}=-I_{DSN}$ ($I_{DSP}$ and $I_{DSN}$ being the saturated drain current of PMOS and NMOS, respectively). Therefore, the inverter input voltage can be expressed as:

$$V_{inv} = ADET = \frac{\Delta V + V_{THP} + V_{THN}\sqrt{\frac{\beta_N}{\beta_P}}}{1+\sqrt{\frac{\beta_N}{\beta_P}}},$$

where $\Delta V = V_{APK}-V_{CMI}$, and β is the MOS transistor gain factor.

If $\beta_N=\beta_P$ and $V_{THN}=V_{THP}$, the inverter switching threshold would be $\Delta V/2$. Therefore, making $$\frac{\beta_N}{\beta_P}$$

equal to 1 results in a perfectly symmetrical supply switching point.

The NMOS and PMOS gain factor ratio needs to be exaggerated to accommodate the $MP_D$ $V_{SG}$ detection value and the large input voltage and hence supply range. The switching points need to be adjusted to the left of the $\Delta V/2$. The inverter gain factor ratio are determined both empirically and theoretically to be much greater than 10. Inverter B2 470 is implemented the same way as inverter B1 430. And the final two inverters B3 480 and B4 490 have more conventional transfer characteristics.

The enable signal ENA 410 generated by the signal detector 170A represents the baseband data used in the modulator 120. This enables or disables the VCO 145A of FIG. 1, which generates the high frequency carrier signal as described above.

Figure 6:
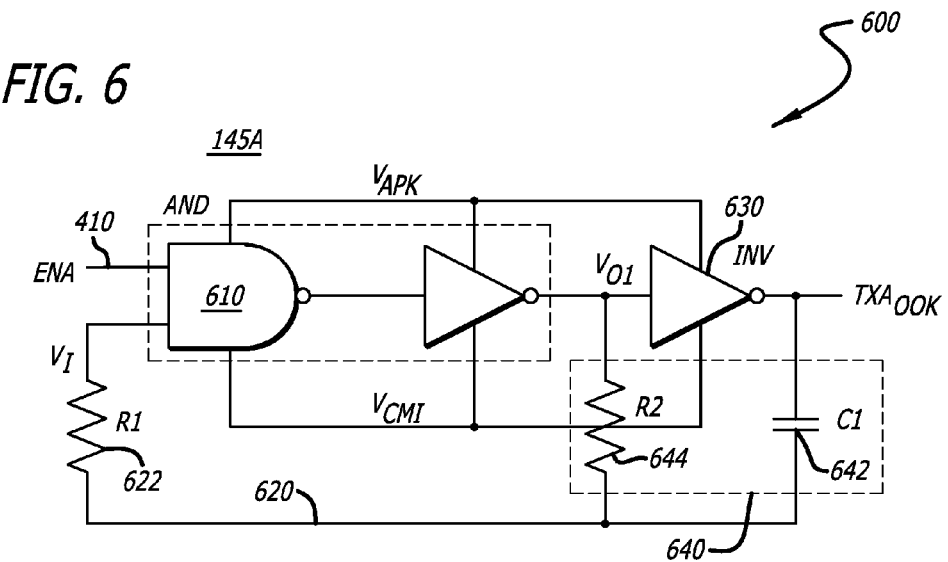
FIG. 6 is a diagram illustrating the circuitry of an exemplary voltage-controlled oscillator (VCO).

Referring to FIG. 6, a diagram illustrating the circuitry 600 of an exemplary embodiment of the voltage-controlled oscillator (VCO) 145A of FIGS. 1 and 4 is shown. In the embodiment shown, the VCO 145A is a CMOS astable multivibrator (or relaxation oscillator). Astable multivibrators switch continuously between their two unstable states at a constant repetition rate thereby producing a continuous square wave output. They are easily constructed with standard CMOS gates and a few passive devices.

As shown in FIG. 6, the AND gate switch device 610 generates a high or low level; then the R2/R1 feedback network 620 returns output voltage to switch the AND gate switch device 610 and makes it change its state. The delay device/inverter (INV) 630 changes the oscillation frequency by charge and discharge of R2C1 feedback network 640.

The VCO 145A operates as follows: let $V_{ON}=V_{OFF}=V_{th}=\Delta V/2$, where $\Delta V=V_{APK}-V_{CMI}$. First metastable state occurs at power-up (t=0): $V_{O1}=V_{OH}$ and $V_I=TXA_{OOK}=V_{OL}$. Once capacitor C1 642 is charged to $V_I$ and made to be equal to a threshold voltage ($V_{th}$), the VCO 145A now enters its second metastable state. In this state, capacitor C1 642 discharges and $V_I$ begins to decrease. Once $V_I$ reaches $V_{th}$, the VCO 145A flips back to the first metastable state.

$V_{O1}$ and $TXA_{OOK}$ can only be $V_{APK}$ or $V_{CMI}$ and they are complementary. Therefore, they change into the opposite state when $V_I$ is equal to $V_{APK}/2$. When inverter (INV) 630 transitions from $V_{APK}$ to $V_{CMI}$, capacitor C1 642 is charged to $-0.5V_{DD}$ (the left plate is negative), so $V_I$ becomes $-0.5V_{APK}$ and starts to increase because resistor R2 644 is connected to $V_{APK}$:

$$V_I = V_{APK}\left(1 - e^{\frac{t}{\tau}}\right) - \frac{V_{APK}}{2} \cdot e^{\frac{t}{\tau}} = V_{APK} - \frac{3V_{APK}}{2} \cdot e^{\frac{t}{\tau}}$$

$$\frac{V_{APK}}{2} = V_{APK} - \frac{3V_{APK}}{2} \cdot e^{\frac{t}{\tau}} \xrightarrow{yields} \frac{1}{3} = e^{\frac{-t}{\tau}} \xrightarrow{yields} 3 = e^{\frac{t}{\tau}} \xrightarrow{yields} \ln 3 = \frac{t}{\tau}$$

t=τ ln 3=R2C1 ln 3=1.0986R2C1, where t is the half period, since the VCO switches exactly at $V_{APK}/2$.

Therefore, the predicted oscillator period T for the OOK carrier signal is given by: T=2t=2.2R2C1.

The VCO 145A has sufficiently large gain and the stability and start-up performance is guaranteed by the additional inverter stage. The resistance of the coupling resistor R1 622 needs to be much greater than that of resistor R2 644. In one embodiment resistor R1 622 is approximately 10 times resistor R2 644.

Once the VCO 145A is powered and has a sufficient operating range, it is controlled or modulated by the enable (output) signal ENA 410 of the signal detector 170A. Substantially similar operations, as described above, are conducted by VCO 145b.

Figure 7:
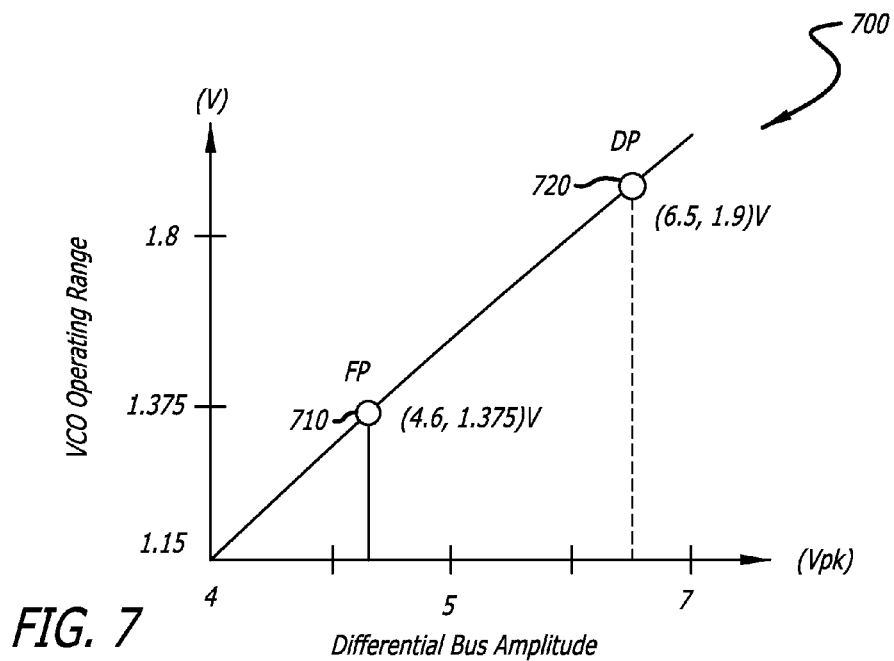
FIG. 7 is an exemplary illustration of an operating range of the VCO.

Referring to FIG. 7, an exemplary illustration of an operating range 700 of a VCO (e.g., the VCO 145A of FIG. 1) is shown. The first point FP 710 denotes when the oscillation is functional. The functional criteria include not only voltage headroom but also start-up time. An ARINC 429 minimum half bit time is 5 μs, and ideally the VCO 145A should be active during this interval for qualified signals. At second point DP 720 the start-up is less than 1.5 μs and the oscillation frequency is approximately 30 MHz.

The VCO 145A generates the carrier signal for the OOK modulation. Point DP 720 corresponds to the minimum detectable signal specification. The ALR qualifies data with differential amplitudes greater than or equal to |6.0|V, causing the enable signal ENA 410 to be at the correct logic level which modulates the VCO's amplitude by a factor of 1 or 0 and completing the OOK modulation of the ARINC 429 bus data.

It should be appreciated that because ARINC 429 data has controlled null to amplitude slew rates, the supply range for the carrier generator (e.g., VCO 145A of FIG. 1) may vary for approximately half of the OOK modulation "on" state. This produces several amplitude and frequency components in the carrier signal. The multiple frequency components do not affect the proper operation of the system, however, because the minimum oscillation frequency of the VCO is approximately 30 MHz, as described above, which is much greater than (approximately 150 times) the 200 kHz bandwidth of the differential ARINC 429 data.

The demodulator 130 receives and demodulates the OOK signal generated by the modulator 120. Differential ARINC 429 bus data is recovered in binary form at the ALR digital outputs. Since the received signal is ASK modulated with a modulation depth less than unity, the envelope detector 135 of FIG. 1 can be used to recover the modulating signal.

Figure 8:
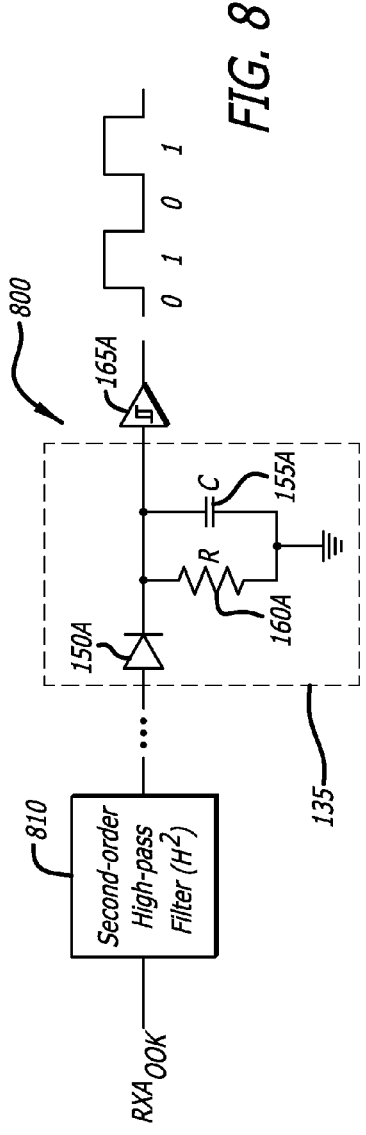
FIG. 8 is a diagram illustrating an exemplary simplified envelope detector.

Referring to FIG. 8, a diagram illustrating an exemplary simplified embodiment of circuitry 800 associated with demodulator 130 of FIG. 1 is shown. The circuitry 800 comprises a second-order high pass filter ($H^2$) 810 and envelope detector 135 of FIG. 1. The envelope detector 135 comprises diode 150A, resistor R 160A, and capacitor C 155A, where the envelope detector 135 is coupled to the Schmitt-trigger 165A, with a detector time constant of τ=RC.

Figure 9:
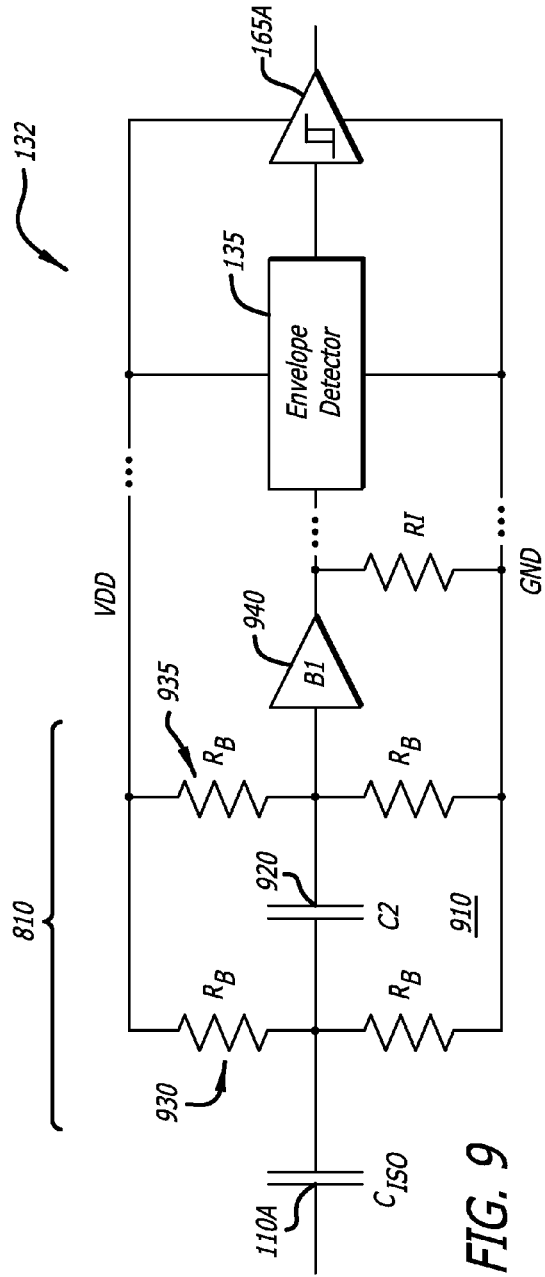
FIG. 9 is a diagram illustrating an exemplary half-circuit for the demodulator.

More specifically, referring now to FIG. 9, a more detailed illustrative embodiment of circuitry 800, namely the half circuit 132 of the demodulator 130 that corresponds to the first circuit 122 of the modulator 120 is shown. For this embodiment, the transmission channel for the $TXA_{OOK}$ signal from the modulator 120 to the demodulator 130 is the isocap 110A. The isocap 110A forms a single pole high-pass filter and is connected to DC-biasing receiver resistors (RB) of the demodulator 130, which is cascaded with an additional high-pass filter 910 (e.g., capacitor C2 920 in parallel with resistor pairs 930 and 935) with the same corner frequency. The resulting second-order high-pass filter circuit 810 will have a roll off of approximately −40 dB/decade (−12 dB/octave). The transfer function (TF) is given by:

$$H^2_{HP}(s) = \frac{s^2}{s^2 + \frac{3}{C_{ISO}R_B}s + \frac{1}{C^2_{ISO}R^2_B}},$$

with the simplifying assumption that the $C_{ISO}$ and C2 are equal ("$C_{ISO}$" being the capacitance of the isocap 110A).

The TF has two zeros at DC and a double pole at corner frequency (fc). The second-order high pass filter circuit 810 has no output voltage from DC to fc. This lower cut-off frequency point is 70.7% (or −3 dB, dB=−20 log $V_{out}/V_{in}$) of the voltage gain allowed to pass. The second-order high pass filter circuit 810 attenuates unwanted transient components during bus transitions and VCO initialization and decay. The corner frequency (fc) for the second-order high pass filter circuit 810 has to accommodate the lowest frequency component in the carrier signal. The differential ARINC 429 data has a bandwidth of 200 kHz, and in one embodiment, the minimum VCO frequency is approximately 30 MHz at power-up and approximately at 65 MHz at ALR sensitivity point. The filter parameters may be set for a 35 MHz–3 dB point.

Diode non-linearity, pass-band ripple, and negative peak clipping can severely affect the demodulation. The non-linearity for diode 150A is inherit in its IV characteristics, and there is little that can be done to minimize this effect. Fortunately the result from this non-ideality is harmonic distortion and the effect is negligible in the demodulator 130 according to embodiments of the disclosure. However, the remaining two factors, namely pass-band ripple and negative peak clipping, have the potential to seriously affect system performance of the demodulator 130.

Transmitted OOK signal c(t) of frequency fc is input to the envelope detector 135 (with time constant τ=RC) of the demodulator 130. Therefore, the time between successive peaks of c(t) is T=F$^{-1}$$_c$. Each peak will charge the capacitor C 155A to A'$_c$, the approximate peak OOC voltage value of A$_C$ (or V$_{PK}$), and each "non-peak" will discharge the capacitor C 155A to some "non-peak" voltage (or V$_{NPK}$):

$$V_{NPK} = A_C \cdot e^{\frac{-T}{\tau}},$$

which, provided that T is much less than τ, is approximately the same as:

$$V_{NPK} \approx A_C \left(1 - \frac{T}{\tau}\right)$$

The peak-to-peak size of the ripple, or ΔV, will therefore be:

$$\Delta V \approx \frac{A_C \cdot T}{\tau} = \frac{A_C}{f_C \cdot \tau},$$

where ΔV constitutes the pass-band ripple of the detector 800.

Since the baseband data is binary, sufficient pass-band ripple can cause demodulation errors by glitching the output buffer. Time constant τ needs to be sufficiently large to reduce the ripple voltage in the recovered m(t) baseband signal. A Schmitt-trigger buffer 165A is communicatively coupled to an output of the envelope detector 135 to ensure that the output does not glitch in the presence of severe ΔV. The Schmitt-trigger's positive threshold, or low-to-high trip point is set to filter pass-band ripple. The input amplitude AC gets converted to CMOS signal levels by buffer B1 940. The switching threshold for buffer B1 940 may be set to V$_{DD}$/2 and it is initialized to logic "0". Therefore V$_{PK}$=V$_{DD}$-V$_{BE}$, and V$_{NPK}$ is the droop value determined by the carrier signal period T and the time constant τ. Increasing τ reduces ΔV; however τ still needs to be very short compared to T. The capacitor C 155A of the envelope detector 135 charges rapidly and thereby follows the applied voltage up to the positive peak when the diode is conducting. If the capacitor C 155A of the envelope detector 135 is too large its response time will be slow and it will not follow sudden reductions in amplitude, causing the capacitor voltage to decline according to:

$$V_{drop} = A_C \cdot e^{\frac{-t}{\tau}}$$

This produces a negative peak clipping effect where any swift reductions in the ASK wave's amplitude are "rounded off" and the output is distorted. The high-to-low transition will have a slow tail-off or fall time, resulting in duty-cycle distortion of the recovered baseband and possible timing errors in the digital decoder. Therefore, the negative threshold or high-to-low Schmitt-trigger trip point is set at the level that corresponds to an ARINC 429 half bit-time.

Therefore, negative peak clipping can be minimized by making the time constant τ small. However, to minimize ripple it is necessary to make τ large. Therefore, τ needs to satisfy: 1/BW (BW being the differential ARINC 429 data bandwidth)<<τ<<1/fc. Because ensuring this inequality is necessary for successful modulation and demodulation, the system is inherently plagued by ripple and negative peak clipping. These performance limitations can be removed by employing a Schmitt-trigger with appropriate threshold values. The value of the time constant τ for this system is approximately 125 ns.

It should be appreciated that although the demodulator 130 comprising two half circuits 132, 134 each comprising an analog envelope detector 135, 137 and a Schmitt trigger 165A, 165B has been described, the disclosure is not limited by the composition of the demodulator 130 described heretofore. The demodulator 130 may comprise any circuitry that is capable of recovering the digital baseband data from the ASK-modulated signals. For instance, in lieu of analog circuitry, the demodulator 130 may be configured with digital demodulation circuitry is described below.

Figure 10:
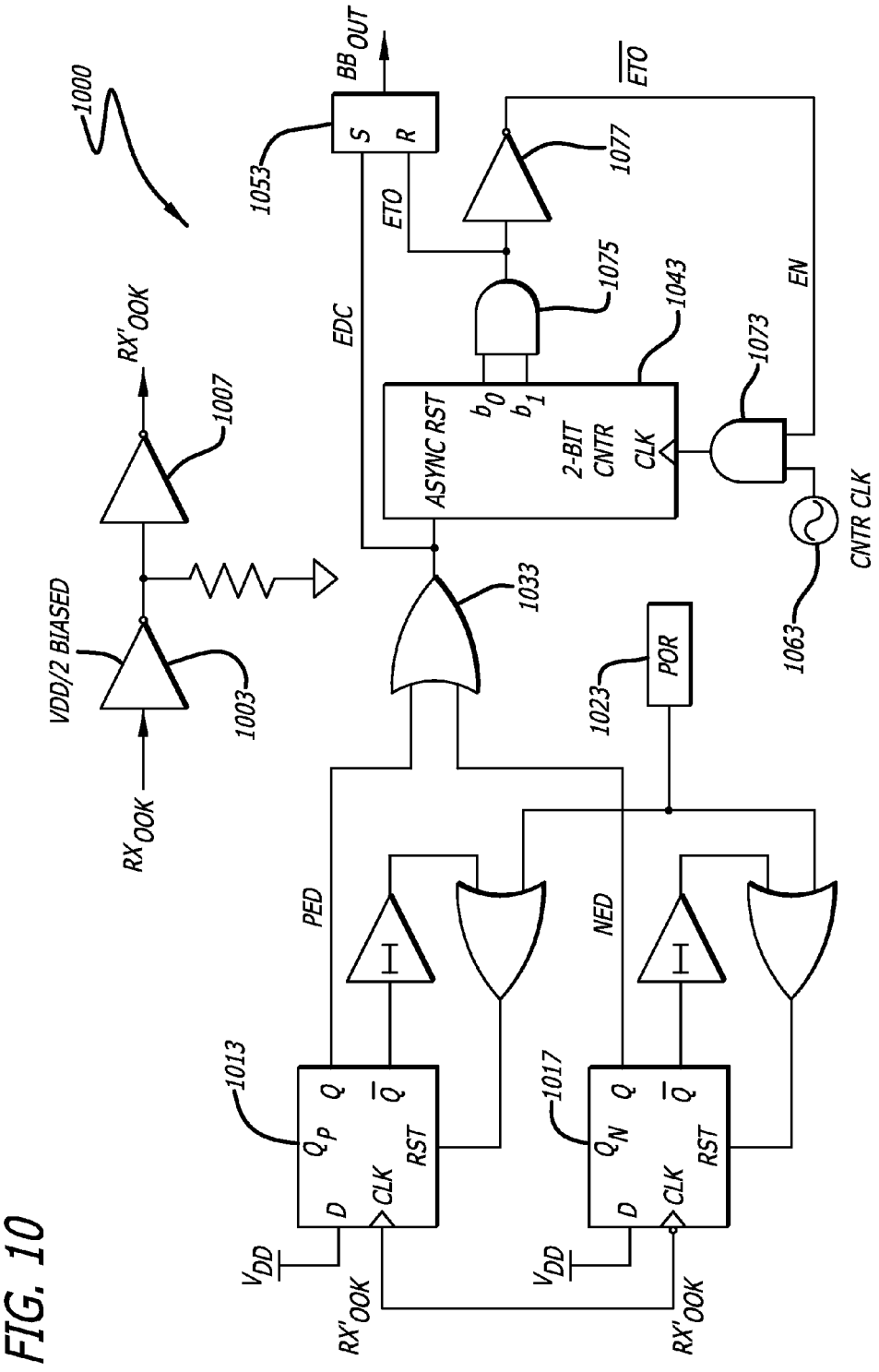
FIG. 10 is a diagram illustrating an exemplary half-circuit for the demodulator.

Referring to FIG. 10, a diagram illustrating an exemplary embodiment of a half digital demodulation circuit 1000 of the demodulator 130 is shown. It should be appreciated that in this embodiment, two half circuits 1000 with the same architecture are needed for a complete demodulator 130, where each half circuit 1000 is used to demodulate one of the modulated signals RXA$_{OOK}$, RXB$_{OOK}$. The half circuit 1000 works as a frequency-to-digital converter (also known as a digital peak detector or a clock detector) by producing a logic "1" when a clock signal at the V$_{DD}$ amplitude is present at the input and producing a logic "0" when a clock signal is not present at the input.

Herein, an OOK-modulated signal RX$_{OOK}$ (i.e., either RXA$_{OOK}$ or RXB$_{OOK}$) passes through a first inverter 1003 biased at V$_{DD}$/2 and a second inverter 1007 and is normalized to the V$_{DD}$ amplitude. The amplitude-normalized signal may be referred to as the RX'$_{OOK}$ signal. The RX'$_{OOK}$ signal drives two D flip-flops (Q$_P$ 1013 and Q$_N$ 1017) that function as positive and negative edge detectors. The output Q of the D flip-flop Q$_P$ 1013, namely PED, goes high for a low-to-high RX'$_{OOK}$ transition (i.e., a positive edge), and the output Q of the D flip-flop Q$_N$ 1017, namely NED, goes high for a high-to-low transition (i.e., a negative edge). D flip-flops Q$_P$ 1013 and Q$_N$ 1017 are cleared to logic "0" after a gate-delay once PED and NED are asserted or during the power up cycle via a power-on reset (POR) circuit 1023. The logic OR (produced by an OR gate 1033) of PED and NED signals produces the edge detection clock (EDC) signal. The EDC signal drives the asynchronous reset input of a 2-bit synchronous binary counter 1043 along with the set input (S) of an SR (Set/Reset) latch 1053. The binary counter 1043 is asynchronously cleared when the EDC signal is asserted.

The counter clock 1063 is AND-gated (by an AND gate 1073) with the logic NAND (produced by an AND gate 1075 and an inverter 1077) of the outputs b$_0$ and b$_1$ of the binary counter 1043 before being fed into the clock input of the binary counter 1043, thereby disabling the clock input of the counter 1043 once it reaches its terminal count (i.e., logic "11"). The counter clock 1063 may be a free-running voltage-controlled oscillator that has a maximum frequency that is lower than twice the minimum ASK carrier frequency since the EDC signal is true for both edges. Therefore, every edge of RX'$_{OOK}$ signal resets the counter 1043 to logic "00" and sets the demodulated baseband, namely BB$_{OUT}$, to logic "1". The clock path is also enabled and will continue until the terminal count of "11" is reached and the edge timeout (ETO) signal is asserted, which resets the SR latch 1053 and clears BB$_{OUT}$ to logic "0". The terminal count "11" also disables the clock input of the binary counter 1043 until the next edge in the RX'$_{OOK}$ signal is detected.

It should be appreciated that FIG. 10 merely illustrates an exemplary implementation of a digital ASK demodulation circuitry. Digital demodulation circuits different from the circuitry illustrated in FIG. 10, including the substitution of different logic components (e.g., AND, OR, XOR, inverter, etc.), may also be utilized without deviating from the present disclosure.

Therefore, herein according to one embodiment of the disclosure, a monolithic ARINC 429 physical layer receiver has been described in detail that galvanically isolates an ARINC 429 bus not only from V$_{DD}$ and V$_{SS}$, but from all other device pins without a second set of power and ground pins or an integrated charge-pump that would require at least one additional isolated ground pin. The apparatus uses a differential passive voltage divider along with a half-wave single-ended bus rectifier to supply the modulator differential amplitude detector and oscillator that constitute the ASK modulation circuit. The detector converts the differential bus amplitude to binary "1" for a valid ARINC 429 high or low level and outputs a binary "0" otherwise. This signal is multiplied with the oscillator output, which serves as the carrier signal for the ASK modulation, thus creating OOK modulation. The modulator is laterally isolated from the capacitive oxide isolation barrier by floating PTUBs enclosed in a substrate ground PTUB. The isolation capacitor is rectangular metal-to-metal structure with a 1050 nm dielectric thickness. This brings the lateral DC isolation to the vertical limit of ±1.0 KV set by the BOX thickness. The demodulator uses an amplitude mapping technique to drive an envelope detector. A CMOS Schmitt-trigger is tuned to minimize the effects of voltage ripple and negative peak clipping.

Although various circuits and their associated parameters have been described in detail, it should be appreciated that the circuits and parameters do not limit the disclosure, and that the circuits may be adapted or modified without deviating from the scope of the present disclosure. Furthermore, it has been contemplated that within the scope of the present disclosure, the analog front end described herein may be adapted for differential buses other than an ARINC 429 bus with necessary modifications based on signal characteristics associated with the differential buses.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. An apparatus for receiving differential bus signals, comprising:
    a modulator that modulates the differential bus signals onto a carrier signal and generates a modulated signal using only power supplied by the differential bus; and
    a demodulator that recovers differential bus baseband binary data from the modulated signal,
    wherein the modulated signal propagates from the modulator to the demodulator through capacitive coupling.

2. The apparatus of claim 1, wherein the modulator comprises one or more voltage-controlled oscillators.

3. The apparatus of claim 2, wherein the modulator modulates the differential bus signals onto the carrier signal using amplitude-shift keying (ASK).

4. The apparatus of claim 1, wherein the demodulator comprises a high-pass filter and an envelope detector.

5. The apparatus of claim 4, wherein the demodulator further comprises a Schmitt-trigger.

6. The apparatus of claim 1, wherein the demodulator comprises a frequency-to-digital converter.

7. The apparatus of claim 1, wherein the apparatus is fabricated in a monolithic integrated circuit using a complementary metal-oxide-semiconductor (CMOS) silicon on insulator (SOI) process.

8. The apparatus of claim 7, wherein the modulator is situated in a floating p-type doped tub (PTUB) enclosed by one or more floating oxide trenches.

9. The apparatus of claim 8, wherein a total breakdown voltage of the one or more floating oxide trenches is approximately 1 kV.

10. The apparatus of claim 8, wherein the floating PTUB and the one or more floating oxide trenches are further enclosed by a grounded oxide trench.

11. The apparatus of claim 1, further comprising one or more isolation capacitors situated in one or more floating p-type doped tubs (PTUBs), each PTUB being enclosed by one or more floating oxide trenches, the isolation capacitors providing the capacitive coupling.

12. The apparatus of claim 1, wherein the differential bus is an Aeronautical Radio, Incorporated (ARINC) 429 bus.

13. A method for receiving differential bus signals, comprising:
    modulating at a modulator the differential bus signals onto a carrier signal and generating a modulated signal using only power supplied by the differential bus; and
    recovering at a demodulator differential bus baseband binary data from the modulated signal,
    wherein the modulated signal propagates from the modulator to the demodulator through capacitive coupling.

14. The method of claim 13, wherein prior to modulating the differential bus signals, the method further comprises galvanically isolating one or more inputs of the modulator that receives the differential bus signals from one or more outputs for the binary data.

15. The method of claim 14, wherein prior to modulating the differential bus signals, the method further comprises generating voltage references for the modulator through a differential passive voltage divider to supply the power from the differential bus signals.

16. The method of claim 14, wherein the galvantically isolating the one or more inputs of the modulator comprises coupling one or more isolation capacitors to at least a first output of the modulator and at least a first input of the demodulator through which the modulated signal is routed.

17. The method of claim 13, wherein the modulating of the differential bus signals onto the carrier signal comprises modulating the differential bus signals using amplitude-shift keying (ASK).

18. The method of claim 13, wherein the both the modulator and the demodulator are fabricated in a monolithic integrated circuit using a complementary metal-oxide-semiconductor (CMOS) silicon on insulator (SOI) process.

19. The method of claim 18, wherein the modulator is situated in a floating p-type doped tub (PTUB) enclosed by one or more floating oxide trenches.

20. The method of claim 19, wherein the floating PTUB and the one or more floating oxide trenches are further enclosed by a grounded oxide trench.

21. The method of claim 13, wherein the capacitive coupling is provided by one or more isolation capacitors situated in one or more floating p-type doped tubs, each of the one or more floating p-type doped tubs being enclosed by one or more floating oxide trenches.

22. The method of claim 13, wherein the differential bus signals are Aeronautical Radio, Incorporated (ARINC) 429 compliant bus signals.

* * * * *